United States Patent [19]

Brust

[11] Patent Number: 4,522,717
[45] Date of Patent: Jun. 11, 1985

[54] FILTER APPARATUS

[76] Inventor: John E. Brust, 2600 NE. Loop 410, No. 816, San Antonio, Tex. 78217

[21] Appl. No.: 507,331

[22] Filed: Jun. 24, 1983

[51] Int. Cl.$^3$ .............................................. B01D 27/06
[52] U.S. Cl. .................................. 210/238; 210/323.2; 210/340; 210/445; 210/450; 210/455
[58] Field of Search ............ 210/232, 239, 238, 323.2, 210/340, 341, 441, 445, 450, 451, 455

[56] References Cited

U.S. PATENT DOCUMENTS

| | | |
|---|---|---|
| 1,787,577 | 1/1931 | Hills . |
| 2,013,776 | 9/1935 | Wiesman ............................... 210/182 |
| 2,302,116 | 11/1942 | Gill ....................................... 210/131 |
| 2,707,563 | 5/1955 | Kasten et al. ......................... 210/184 |
| 2,953,249 | 9/1960 | Topol et al. .......................... 210/305 |
| 3,405,807 | 10/1968 | Burkhardt ..................... 210/323.2 X |
| 3,615,016 | 10/1971 | Soriente et al. ............... 210/323.2 X |
| 3,645,402 | 2/1972 | Alexander et al. .................. 210/266 |
| 4,228,012 | 10/1980 | Pall .............................. 210/323.2 X |
| 4,334,995 | 6/1982 | Mahon ................................. 210/340 |
| 4,419,234 | 12/1983 | Miller et al. ................. 210/323.2 X |

Primary Examiner—Thomas Wyse
Attorney, Agent, or Firm—Dunlap & Codding

[57] ABSTRACT

A filter apparatus including a plurality of demountable filter cartridges which each include a replacement filter element. The cartridges are mounted in the upper portion of a bi-level partition that extends across a tank having an inlet below the partition and an outlet above the lower portion of the partition at a height to be bisected by the upper surface of the upper portion of the partition. A plurality of filter apertures through the partition each receive a cartridge and each cartridge is held in place via studs that screw into the partition and received in channels formed in a header portion of the cartridge so that the cartridge can be inserted into an aperture and turned to engage the shanks of the studs with the channels in the cartridge header. The headers of the cartridges are constructed in two parts and connected by a tubular connector having threads of opposite senses on its periphery and in its bore to be screwed into one part of the header and over a threaded projection on the other part of the header to clamp the two pieces of the header together about an O-ring that seals the cartridge to the aperture wall.

24 Claims, 6 Drawing Figures

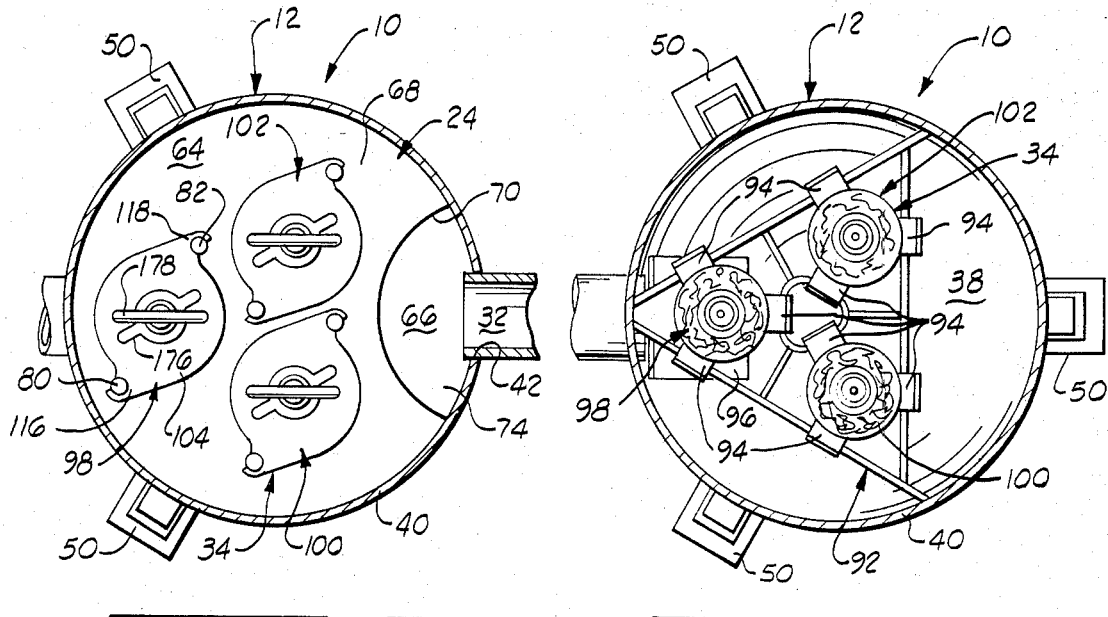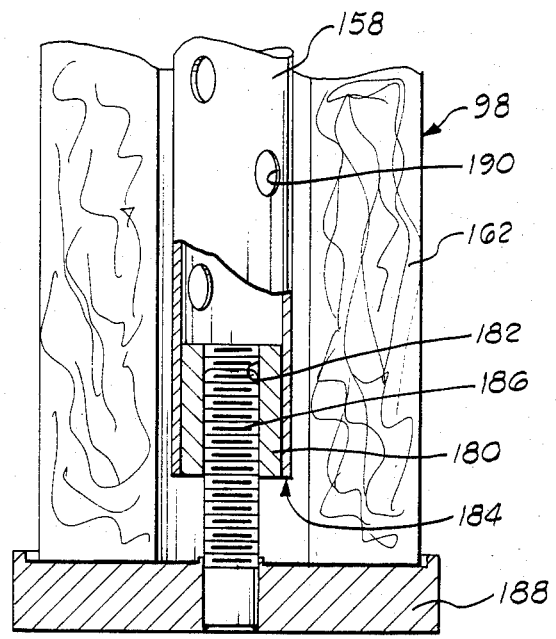

FILTER APPARATUS

BACKGROUND OF THE INVENTION

1. Field of the Invention

The present invention relates generally to filter apparatus having replaceable filter elements and, more particularly, but not by way of limitation, to apparatus for filtering liquid-gas mixtures.

2. Brief Description of the Prior Art

Filters are used for a variety of purposes in industry to remove particulate matter from various fluids. For example, in a process for synthesizing a chemical product from given feed stocks, it may be necessary to filter the feed stocks entering a reactor in which the synthesis is carried out, the product from the reactor, or both. Filters are also often used in processes in which a fluid is continuously circulated to carry out some purpose; for example, cleaning, and then reused after removal of contaminants introduced by the use to which the fluid is put.

To meet the varying purposes for which filters are used, a variety of types of filter units have been developed. In particular, it is known to construct a filter unit to comprise a tank having an inlet portion and an outlet portion that are separated by one or more filter cartridges that can be replaced by opening the tank to remove the cartridges and replace them other cartridges. In some cases, the cartridge is designed to be discarded after it has become clogged while, in other cases, the cartridge is designed to be cleaned and replaced in the tank. In either of these cases, the cartridge may include a filter element and an element holder so that the filter element can be removed and discarded or removed and cleaned.

While filter units which include removable cartridges can often provide economical solutions to particular filtration problems, difficulties have existed with prior art filter units of this type. In particular, difficulties have arisen with replaceable cartridge type filter units which must filter a liquid-gas mixture in operation. Because of the tendency of the liquid and gas to separate, the outlet of the tank must be placed near the upper end thereof in order that the gases entering the tank can escape therefrom. On the other hand, liquids entering the tank must rise to the level of the outlet to issue from the tank. These requirements can conflict to cause problems in the replacement of filter elements in the apparatus. If the outlet is high enough on the tank to permit any gas entering the tank to escape therefrom, liquid entering the tank will rise to a correspondingly high level and remain at such level when fluid flow into the tank is discontinued to permit replacement of filter elements. The result is that a high placement of the outlet tends to cause submergence of filter cartridges in the filter apparatus so that the tank must be at least partially drained to replace the cartridges. Thus, a high placement of the outlet with respect to the cartridges can result in excessive down time of a process using a filter apparatus when filter elements must be replaced and, in addition, can result in an undesireable loss of liquid from a system in which the filter apparatus is used. Returning the liquid to the system can, in some cases, give rise to unwanted contamination of chemicals which are involved in the process in which the filter apparatus is used. On the other hand, placement of the outlet low on the tank to prevent submergence of the filter cartridges can result in trapping of gases in the upper end of the tank with various attendant problems; for example, a pressure build-up in the tank that can rupture seals or give rise to excessive power requirements to force a fluid through the tank.

Other problems can also arise with filter apparatus designed to filter liquid-gas mixtures. In some cases, tank outlets have been placed on the cover of the tank that is removed to replace the cartridges in order to prevent a build-up of gas pressure in the tank. When this occurs, not only can a cartridge submergence problem arise but it becomes necessary to disconnect conduits connected to the outlet in order to remove the cover. Such discontinuation will increase an already undesireably long down time, stemming from the need to drain the tank for filter replacement when the outlet is so mounted, for a process in which the apparatus is used.

In general, then, prior art filter apparatus have not provided filter users with filtration capabilities that are desired when the process in which the filter apparatus is used requires that a liquid-gas mixture be filtered. In the past, users of filter units have had to accept problems related to gaseous pressure build-up in such units or, in avoiding these problems, have had to accept excessive process down times in periodically replacing filter cartridges in the units. The present invention provides a versatile filter apparatus which is capable of filtering a liquid-gas mixture without gaseous pressure build-up in the apparatus and, at the same time, has a rapid filter element replacement capability.

SUMMARY OF THE INVENTION

The above described problems are solved in the present invention by providing a filter apparatus in which the tank outlet is disposed on the side of the tank, thereby permitting ready removal of the tank cover for replacement of the cartridges, and, further, is positioned with respect to the mounting of the cartridges to drain portions of the tank about headers forming portions of the cartridges, when fluid flow into the apparatus is discontinued, without disrupting the ability of the filter unit to filter a liquid-gas mixture. Thus, the cartridges in the filter apparatus of the present invention can be replaced by merely removing the cover of the tank in which the cartridges are disposed and without any need to drain the tank to prevent contamination of fluid downstream of the cartridges.

In particular, the cartridges are mounted in the upper tier of a two-tiered partition that extends across the tank of the filter apparatus of the present invention and an outlet port for the tank is formed, above the lower tier of the partition, on a line with the upper partition so that the level of liquid in the tank of the filter apparatus remains below portions of the partition whereon the filter cartridges are mounted. Thus, a filter cartridge can be removed from the apparatus, by removing a cover that is located above the partition, with no danger that filtered and unfiltered fluid will mix to contaminate portions of the tank above the partition which divides the tank.

In order to minimize down time of a process in conjunction with which the filter apparatus is used, the filter cartridges are provided with a header that can be secured to the partition, or released therefrom, by merely turning the cartridge. To this end, wings are formed on the header, to which a filter element is attached, and grooves are formed in the wings to receive the shanks of studs mounted on the partition. A catch mechanism is then mounted on the header to hold the header in position once the shanks of the studs have been positioned in the grooves. In addition, the filter apparatus of the present invention is provided with a novel sealing mechanism to prevent fluid from leaking about apertures formed through the partition in which the filter cartridges are mounted. Such mechanism includes forming the header in two parts which are mounted in tandem and providing a mechanism that can selectively draw the two parts together or displace the two parts from each other. Portions of the header at which the two parts abut are disposed in the aperture through the partition and an O-ring is mounted on one of the two parts of the header so that drawing the two parts together forces the O-ring into tight engagement with the wall of the aperture. The mechanism for positioning the two parts of the header comprises a tubular projection on one part that extends into a threaded bore in the other part, such projection having threads that spiral in a sense opposite threads on the bore into which the projection extends. The projection and the part of the header into which it extends are then coupled by a tubular coupling having external threads to mate with the threads on the bore into which the projection extends and internal threads to mate with the threads on the periphery of the projection. The two parts of the header are indexed to prevent relative rotation so that turning the coupling will cause linear motion of one part of the header relative to the other part thereof to squeeze or release the O-ring.

An object of the present invention is to provide a filter apparatus capable of filtering liquid-gas mixtures using filter cartridges which can be replaced without contaminating portions of the apparatus that receives filtered fluid.

Another object of the present invention is to provide a filter apparatus including cartridges which can be rapidly replaced to minimize down time of a process in which the filter apparatus is used.

Another object of the invention is to provide a filter apparatus in which filter cartridges can be replaced without draining the apparatus and without danger of contaminating portions of the apparatus downstream of the filter cartridges.

Still another object of the invention is to provide a sealing system for a filter apparatus which will provide a seal between filter cartridges used in the apparatus without interfering with the replacement of such cartridges.

Other objects, features and advantages of the invention will become clear from the following detailed description of the preferred embodiment of the invention when read in conjunction with the drawings and appended claims.

BRIEF DESCRIPTION OF THE DRAWINGS

FIG. 2 is a cross section of the filter apparatus taken along line 2—2 of FIG. 1.

FIG. 3 is a cross section of the filter apparatus taken along line 3—3 of FIG. 1.

FIG. 6 is a cross section in side elevation and partial cutaway of a lower portion of a filter cartridge illustrating the manner in which a filter element is mounted on the cartridge.

DESCRIPTION OF THE PREFERRED EMBODIMENT

Figure 1:
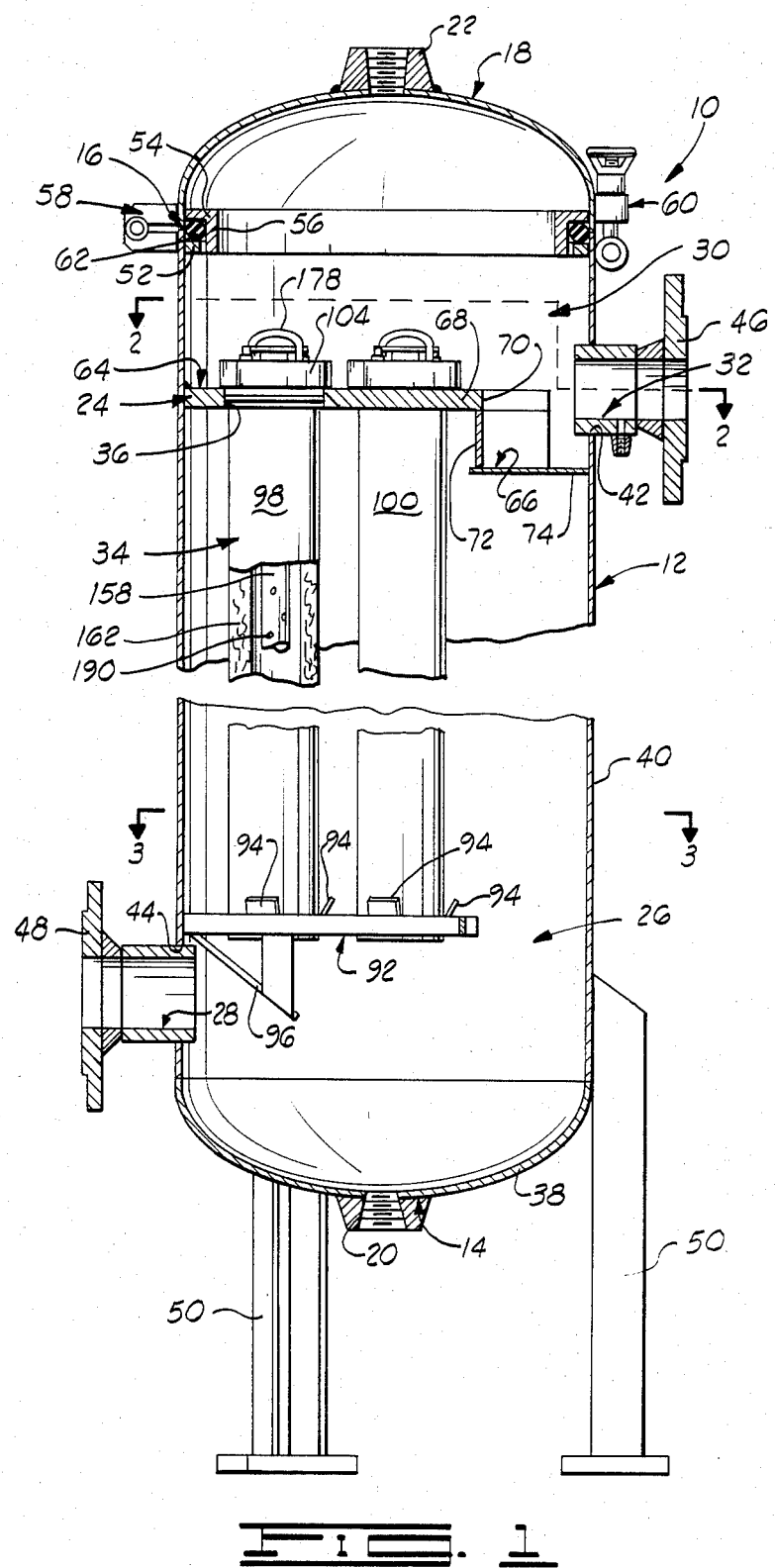
FIG. 1 is a cross section in side elevation of a filter apparatus constructed in accordance with the present invention.

Referring now to the drawings in general and to FIGS. 1-3 in particular, shown therein and designated by the general reference numeral 10 is a filter apparatus constructed in accordance with the present invention. In its general organization, the apparatus 10 is comprised of a tank 12 having a closed lower end 14 and an open upper end 16 which can be closed by a cover 18. (Drains 20 and 22 can be provided in the lower end 14 of the tank 12 and in the cover 18 for draining the filter apparatus 10 should it become desirable to do so.) A partition 24 is sealed to the interior wall of the tank 12, near the upper end thereof, to divide the tank 12 into a lower chamber 26, into which an inlet port 28 opens, and an upper chamber 30, into which an outlet port 32 opens. The partition 24 supports a filter assembly 34 in filter apertures formed through the partition so that fluid introduced into the inlet port of the tank 12 will pass through the filter apertures via the filter assembly and exit the tank via the outlet port 32. (One filter aperture has been shown in the drawings and designated by the numeral 36 therein.)

Referring first to the tank 12, such tank is conveniently fabricated by welding a dome-shaped cap 38 to one end of a metal tube 40, the cap 38 forming the lower, closed end of the tank 12, and forming apertures 42 and 44 through the wall of the tube 40, near the upper and lower ends respectively of the tank 12, to receive fittings, 46 and 48 respectively that define the inlet and outlet ports of the tank and provide for the connection of the filter apparatus 10 to suitable conduits for transporting fluid to and from the apparatus 10. Legs 50, constructed of channel beam, can be welded to the tube 40 to support the tank 12 in the vertical position shown in FIG. 1.

Adjacent the upper end 16 of the tank 12, a ring 52 is welded to the interior wall of the tank 40 to provide for the sealing of the tank 12 by the cover 18 when the filter apparatus 10 is in use. To this end, the cover 18, which has the general form of a dome that sits on the upper end of the tank 12, is provided with an angle iron ring 54 that extends circumferentially about the inner wall of the cover 18 and has a depending flange 56 positioned radially inwardly of the ring 52 to form therewith an annular space that extends circumferentially about the interior wall of the tank 12 at the upper end thereof. The cover 18 is connected to the tank 12 via a hinge 58 and a plurality of dogs 60, one of which has been shown in FIG. 1, are mounted between the tank and the cover 18 so that the upper end of the tank can be closed by securing the cover thereon via the dogs and the tank can be sealed by a sealing ring 62 disposed in the annular space between the rings 52 and 54. Alternatively, the dogs 60 can be released and the cover 18 pivoted on the hinge 58 to provide free access into the upper chamber 30 of the tank 12.

The partition 24 is constructed in three parts to provide the upper surface thereof with an upper tier 64 and a lower tier 66 displaced a distance below the upper tier 64. In particular, the upper tier is provided by the upper surface of a plate 68 which, with the exception of an arctuate cutout 70 at one side thereof, has a circular boundary that is welded to the inside wall of the tank 12. Beneath the plate 68 is a curved plate 72 that is welded at its ends to the interior wall of the tank 12 and is welded along its upper edge to the underside of the plate 68 to extend the length of the cut-out 70. A second plate 74, having a generally lens shaped configuration, is then welded to the lower edge of the curved plate 72 and to the inside wall of the tank so that the partition is sealed to the tank wall to form a barrier between the upper and lower chambers, 30 and 26 respectively, thereof. The upper surface of the plate 74 forms the lower tier 66 of the partition upper surface in the same manner that the upper surface of the plate 68 forms the upper tier 64.

An important aspect of the invention is the placement of the plates 68, 74, and consequently the tiers 64, 66, with respect to the outlet port 32. In particular, and as can be seen in FIGS. 1 and 2, the partition 24 is oriented in the tank 12 so that the outlet port 32 is aligned with the cutout 70 to open into the upper chamber 30 of the tank 12 above the lower tier 74 of the partition upper surface. In addition, the vertical position of the partition 24 is selected so that the upper tier 64 of the partition upper surface bisects the outlet port 32 as can be seen in FIG. 1. Thus, at such times that fluid flow into the tank is discontinued, liquid in the upper chamber 30 of the tank 12 will drain into a well that is formed by the two-tiered structure of the partition 24 for a purpose that will become clear below. In addition, the placement of the outlet port 32 relative to the partition 24 insures that any gases contained in fluid flowing through the filter apparatus 10 can escape freely through the outlet port 32 rather than build up in the upper chamber 30 of the tank 12. That is, such placement of partition 24 and the outlet port 32 makes the filter apparatus 10 suitable for filtering liquid-gas mixtures as well as for filtering liquids alone.

As noted above, the partition 24 is provided with a plurality of filter apertures therethrough and these apertures are more particularly formed through the plate 68 so that they intersect the upper tier of the upper surface of the partition 24. Preferably, these apertures have a circular wall to facilitate sealing between the partition and portions of the filter assembly 34 by a novel sealing system that will be discussed below.

Adjacent each of the filter apertures, and as shown for the filter aperture 36 in FIG. 4, diametrically opposed threaded holes 76, 78 are formed through the plate 68 to permit studs 80, 82 to be screwed into the partition 24 to secure portions of the filter assembly 34 to the partition 24 as will be discussed below. The studs 80, 82 extend through the partition 24 and are locked thereto by lock nuts 84, 86 that are screwed onto the studs to engage the under side of the partition 24. Above the partition 24, each stud comprises a circular shank 88 which is surmounted by a head 90 that is fixed a selected height above the partition 24 to engage portions of the filter assembly 34 and hold such portions against the partition 24.

Below the partition 24, the tank 12 is provided with a triangular framework 92 constructed of metal straps welded to the interior wall of the tank 12 to have openings therethrough that are aligned with the filter apertures in the partition 24. These openings in the framework 92 receive portions of the filter assembly 34 that are inserted through the filter apertures and guide tabs 94 are mounted on the framework 92 to facilitate the introduction of such portions of the filter assembly into the framework 92. The framework 92 also provides a convenient support for a splash plate 96 with which the apparatus 10 can be provided for some applications.

Turning now to the filter assembly 34, such assembly is comprised of a plurality of filter cartridges, one for each filter aperture, that extend through the partition 24 to filter fluid passing from the lower chamber 26 of the tank 12 to the upper chamber 30 thereof. In a preferred embodiment of the invention that has been illustrated in the drawings, the filter apparatus 10 comprises three such cartridges, designated 98, 100 and 102 in the drawings, although it will be clear that a greater or lesser number of cartridges are within the scope of the invention. The cartridges are identical in construction and mounted on the partition 24 in an identical fashion so that it will not be necessary to provide detailed illustrations and descriptions of each of the cartridges, and the manner in which the cartridges are mounted on the partition 24, for purposes of the present disclosure. Rather, the construction of only one cartridge, cartridge 98, has been illustrated in detail in the drawings and will be described along with the mounting of such cartridge on the partition 24. It will be understood that the illustrations and descriptions apply equally well to the cartridges 100 and 102.

The construction of the cartridge 98 can best be seen in FIGS. 1 and 4–6. As shown in these drawings, the cartridge 98 comprises a header 104 having a first end 106, positioned above the upper tier 64 of the partition 24 when the cartridge 98 is mounted in the tank 12, and a second end 108 that is positioned, when the apparatus 10 is ready for use, flush with the underside of the plate 68, portions of the header 104 near the second end 108 thereof being shaped to mate with the wall of the aperture 36 to permit lower portions of the header 104 to be inserted into the aperture 36.

The header 104 is comprised of a first member 110 having a first end coincident with the first end 106 of the header and a second end 112 that is disposed within the aperture 36. A circular periphery 114, matable with the wall of aperture 36, is formed on portions of the first member 110 adjacent the second end 112 thereof, to permit introduction of portions of the first member 110 into the aperture 36 and portions of the first member 110 adjacent the first end thereof are enlarged so that the header 104 can be mounted on the partition 24 to overlay the aperture 36 by inserting the circular periphery 114 into the aperture 36. Above the partition 24, the first member 110 of the header 104 is provided with a pair of laterally extending wings 116, 118 (FIGS. 2 and 5) in which longitudinally extending, U-shaped channels, 120 and 122, respectively, are formed to receive the shanks of the studs 80 and 82, the channels 120 and 122 being positioned to recieve such shanks when the circular periphery 114 adjacent the second end 112 of the first member 110 is inserted into the filter aperture 36 as shown in FIG. 4. The heads of the studs 80 and 82 are positioned above the partition a distance to engage the first end 106 of the header 104 when the header 104 is mounted in the aperture 36 and, as shown in FIG. 5, the channels open in opposite directions so that the header 104 can be mounted on the partition 24 by turning the header 104 to misalign the wings 116 and 118 with the studs 80, 82, inserting the second end 108 of the header 104 into the aperture 36, and then turning the header 104 to a position in which the shanks of the studs 80, 82 are received in the channels 120, 122 and the heads of the studs 80, 82 overlay portions of the wings 116 and 118.

In order to secure the header 104 to the partition using the studs 80, 82, and yet permit the header to be released for removal of the cartridge 98, catch mechanisms are mounted on the header to releaseably secure the shanks of the studs 80, 82 within the channels 120, 122. In particular, and as shown in FIG. 5, transverse blind holes 124, 126 are formed in the first member 110 of the header 104 to open into the mouths of the channels 120 and 122 respectively. The catch mechanism associated with each channel then comprises a ball 128 positioned in the blind hole opening into the channel and a spring 130 that urges the ball partially into the channel. The openings of the blind holes are crimped to retain the balls and springs and the channels are formed with a depth sufficient to receive the major portion of a shank received therein behind the blind holes so that the balls must be forced into the holes to remove the shanks from the channels. The springs 130 are selected to have a spring constant great enough to insure that the header 104 will not turn while the apparatus 10 is in use but small enough to permit manual turning of the header 104 to remove the cartridge 98 from the aperture 36.

Figures 4, 5:
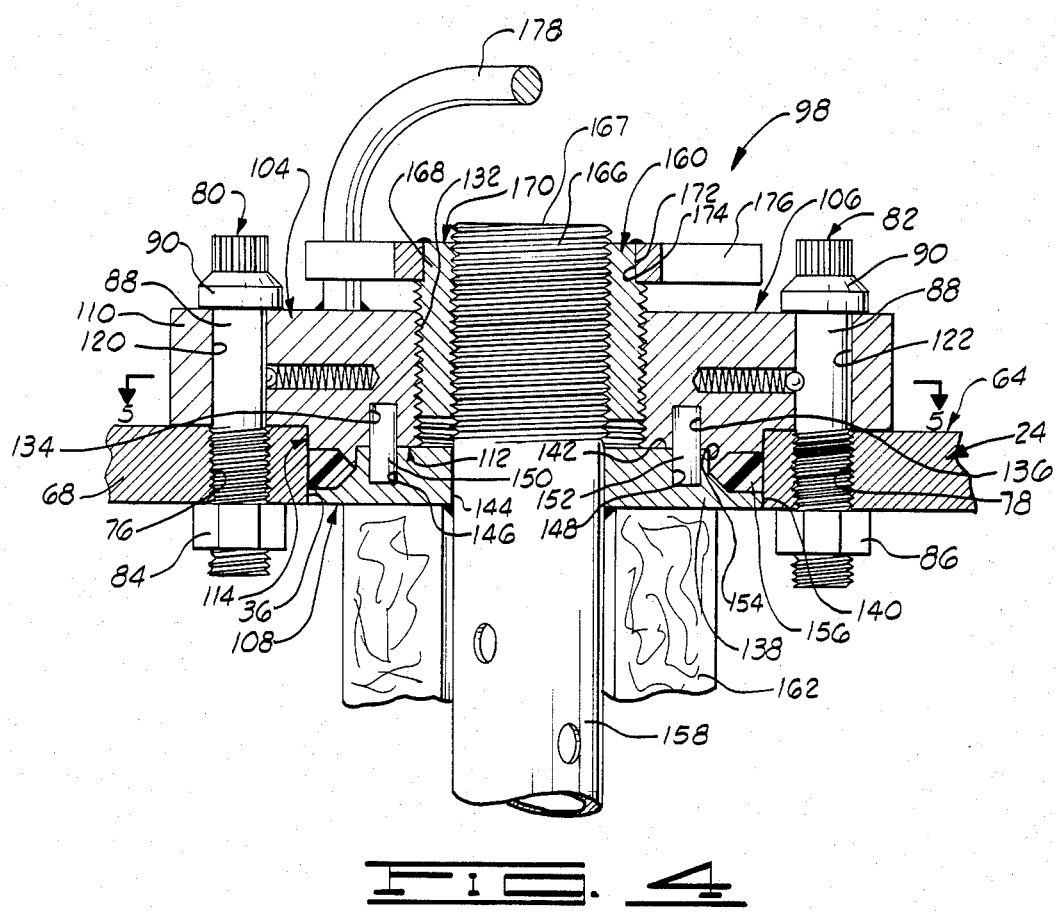
FIG. 4 is a cross section in side elevation of the header of a filter cartridge used in the filter apparatus of FIG. 1.
FIG. 5 is a cross section of the header taken along line 5—5 of FIG. 4.

As shown in FIG. 4, the first member 110 has a longitudinal bore formed axially therethrough, parallel to the channels 120, 122, to intersect the ends of the member 110 so that fluid communication between the chambers of the tank 12 can be effected via such bore 132. For a purpose to be discussed below, the bore 132 is threaded and, more particularly, is threaded in a first sense which is preferably a left-handed sense. A pair of blind holes 134, 136 are formed longitudinally in the second end of the first member to receive portions of an indexing system that will be discussed below.

In addition to the first member 110, the header 104 comprises a circular second member 138 having a periphery 140 that mates with the wall of the aperture 36 and is positioned coaxially with the circular periphery 114 formed on the first member 110 near the second end 112 of the member 110. The two members 110, 138 are coupled together in a tandem relation, via the aforementioned seal system, so that a first end 142 of the second member 138 faces the second end 112 of the first member 110 and can be abutted therewith as shown in FIG. 4. The opposite, or second, end of the second member 138 coincides with the second end 108 of the header 104.

The second member 138 of the header 104 is also provided with an axial bore 144 that coacts with the bore 132 of a first member 110 to provide a fluid passage through the header 104. Similarly, blind holes 146, 148 are formed longitudinally in the first end 142 of the second member 138, to align with the blind holes formed in the second end of the first member 110 and pins 150, 152 are disposed partially in the blind holes in one member and partially in the blind holes in the other member to index the two members 110, 138 together and prevent relative rotation therebetween. In addition, an annular shoulder 154 is formed in the circular periphery 114 or 140 of one of the header members, which can be the second member 138 as shown in the drawings, at the end of such member that abuts an end of the other member. As can be seen in FIG. 4, such shoulder forms a groove in portions of the periphery of the header 104 within the filter aperture 36 to receive an elastomeric sealing ring 156 that forms a seal between the header 104 and the wall of the aperture 36 to prevent unfiltered fluid from seeping about the header 104 into the upper chamber 30 of the tank 12 when the filter apparatus 10 is in use.

The members 110 and 138 of the header 104 are coupled together by the aforementioned sealing system which is indicated generally at numeral 160 in FIG. 4 and is comprised of the indexing system provided by the pins 150, 152, the shoulder 154, the sealing ring 156 and other components as will now be described.

As will be discussed below, the cartridge 98 includes a replaceable filter element 162 which is mounted on the header 104 via a filter support tube 158 having an open upper end 167 and a lower end 184 that is closed as will become clear below. As shown in FIG. 4, the filter support tube 164 is mounted in the bore 144 of the second member 138 of the header 104 and is welded thereto to project from the second end 108 of the header 104. Such projection permits the mounting of the filter element 162 as will be discussed below. However, and as is also shown in FIG. 4, portions of the filter support tube 158 near the open upper end 167 thereof are extended to form a projection 166 on the second member 138 that is disposed within the bore 132 of the first member 110 of the header 104. This projection 166 is externally threaded in a second sense that is opposite the first sense in which the bore 132 is threaded. That is, if the bore 132 is provided with left-hand threads, as is preferred, the projection 162 is provided with right-hand threads as has been shown in FIG. 4. A tubular coupling 168 having internal threads to mate with the threads on the projection 166 and external threads to mate with the threads in the bore 132 is screwed onto the projection 166 and into the bore 132 to couple the two members 110 and 138 together and, concurrently, to form an operating member of the sealing system 160. In particular, because of the presence of the indexing pins 150 and 152 that prevent relative rotation of the two members of the header 104 and, further, because of the different senses of the internal and external threads on the coupling 168, a rotation of the coupling 168 will cause the two members of the header to move linearly in opposite directions parallel to the axes of the bores through the members. Thus, by turning the coupling 168 in one direction, the second member 138 can be displaced from the first member 110 and, conversely, by turning the coupling 168 in the opposite direction, the two members of the header can be drawn together. By this means, the sealing ring 156 can be alternately tightly clamped within the groove formed by the shoulder 154 and released to lie loosely within such groove. In the latter condition of the sealing ring, the portions of the header 104 to be disposed in aperture 36 can be easily inserted thereinto and withdrawn therefrom. In the clamped condition of the sealing ring, portions of the ring 156 are forced outwardly against the wall of the aperture 36 to form an effective seal against leakage between the tank chambers about the header 104 of the cartridge 98. Thus, the heads 90 of the studs 80 and 82 can be positioned relative to the partition 24 to only lightly engage the first end 106 of the header 104, thereby facilitating mounting and demounting of the cartridge 98 in the tank 12, without loss of sealing between the chambers of the tank 12.

As can also be seen in FIG. 4, a portion of the tubular coupling 168 protrudes from the first end 106 of the first member 110 and such protrusion of the tubular coupling 168 is used to provide the sealing system with a stop assembly that prevents decoupling of the two members of the header 104 by turning the coupling 168 too far in the direction that separates these members. In particular, portions of the coupling 168 adjacent the protruding end 170 thereof are cut to form a shoulder 172 that is received in a bore 174 formed through a handle 176 that extends transversely from opposite sides of a coupling 168 to form a portion of the stop assembly. The remainder of the stop assembly is comprised of a U-shaped lug 178 (see also FIG. 1) that is welded to the first end 106 of the first member 110 to extend, in inadverted fashion, over the coupling 168. The legs of the lug are spaced a distance less than the length of the handle 176 to limit the angle through which the handle 176 and, consequently, the coupling 168 can be turned. (See also Figure.) The handle 176 is preferably welded to the coupling 168 and such welding can conveniently be delayed until remaining portions of the header 104 have been assembled to permit fixing of the angle through which the handle will turn.

The lug 178 serves a further purpose of breaking gas loose from a fluid in which it is entrained as is desirable in some applications of the filter apparatus 10. As will be discussed below, fluid is transferred between the two chambers of the tank, through the bore formed through the header 104 by the bores through the elements thereof, via the filter support tube 158 which, because of the above-described construction of the sealing system, opens under the base of the lug 178. Accordingly, if fluid is forced through the filter apparatus 10 at a rapid rate, the fluid will be projected forcefully against the base of the lug 170 to effect an outgassing of a liquid of which the fluid is comprised.

As noted above, the filter cartridge 98 is comprised of the replaceable filter element 162 and, as is shown in the drawings, such element has the form of a porous tube which can be mounted about the filter support tube 158. Filter elements of this type are commercially available, with an example of a suitable element for many applications in which the filter apparatus 10 will be used being the part number G78C8 filter cartridge manufactured by AMF Cuno Division of AMF, Inc., Meriden, Conn., so that the filter element need not be further described herein. In order to mount the filter element 162 on the filter support tube 158, a plug 180, having a threaded axial bore 182 is mounted in the lower end 184 of the filter support tube 158. The bore 182 receives a screw 186 to which is attached a circular plate 188 disposed below the lower end 184 of the filter support tube 158. Accordingly, the filter element 162 can be mounted on the filter support tube 158 by removing the screw 186 and attached plate 188 from the plug 180, thereby permitting the filter element 162 to be run over the filter support tube until the upper end of the filter element 162 engages the second end 108 of the header 104 and then screwing the screw 186 into the bore 182 of the plug 180 to abut the lower end of the filter element 162 with the plate 188, thereby securing the filter element 162 about the filter support tube 158. With the filter element 162 so supported on the filter support tube 158, fluid passed into the inlet port 28 of the tank 12 can be communicated to the periphery of the filter support tube 158 by passing through the porous body of the filter element 162. To further communicate such fluid to the upper chamber 30 of the tank 12, the filter support tube is provided with a plurality of perforations, such as the perforation 190 shown in FIG. 6, through its wall so that fluid which has passed through the filter element 162 will enter the bore of the filter support tube 158 and pass upwardly therein to pass through the header 104 and exit via the open upper end 167 of the filter support tube 158 into the upper chamber of the tank 12.

OPERATION OF THE PREFERRED EMBODIMENT

During the operation of the apparatus 10 to filter a fluid passing therethrough, the cartridges 98 through 102 will be mounted in the filter apertures 36 formed through the partition 24 to intersect the upper tier 64 thereof as has been shown in FIGS. 1 and 2. The fittings 48 and 46 will be connected to a source of fluid to be filtered and a conduit into which the filtered fluid is to be passed from the apparatus 10 and the cover 18 would be disposed atop the tank 12 and held in place by means of the dogs 60. With the apparatus 10 so disposed, fluid introduced into the inlet port 28 will fill the lower chamber 26 of the tank and will pass radially inwardly through the walls of the filter elements 162 forming a portion of each of the cartridges 98 through 102 to be received in the bores of the filter support tubes 158 of the cartridges via the perforations 190 formed in the walls of the filter support tubes. The filtered fluids will then travel upwardly through the bores of the filter support tubes, and through the bores in the headers of the cartridges, to be discharged into the upper chamber 30 from the open upper ends of the filter support tubes 158 formed by the projecting portions 166 thereof. Liquid portions of the fluid will run into the well formed by the lower tier 66 of the partition 24 and, after rising to a depth above the lower tier 66 sufficient to reach the outlet port 32, will be discharged from the filter apparatus 10. Gaseous portions of the fluid will enter upper portions of the outlet port 32; that is, portions of the outlet port 32 above the upper tier 64 of the partition 24 to be similarly discharged from the apparatus 10.

In filtering the fluid passing through the apparatus 10, the filter elements 162 will retain particulate matter and, after a period of use, will require replacement. To accomplish this result, fluid flow into the inlet port 28 is discontinued and the result of such discontinuance of fluid flow into the apparatus 10 will be a draining of any liquid in the upper chamber 30 on the inside wall of the tank 12 and on the upper tier 64 of the partition 24 into the well formed by the provision of the partition 24 with the lower tier 66. In particular, the result of such draining will be that all portions of the upper chamber 30 of the tank 12, above the upper tier 64 of the partition 20 will be free of liquid which might mix with liquid in the lower chamber 26 of the tank, should a cartridge be removed from the apparatus 10, to cause a contamination of the upper chamber 30 of the tank.

With the liquid disposed above the lower tier 66 of the partition 24, the dogs 60 holding the cover 18 to the tank 12 are released and the cover 18 is opened by pivoting the cover 18 about the hinge 58. One or more of the cartridges 98 through 102 can then be removed and replaced as will now be described for the cartridge 98. The cartridges 100 and 102 can similarly be removed and replaced so that it will not be necessary to describe the removal and replacement of the cartridges 100, 102. Rather, it will be clear that the following discussion applies equally well to these cartridges.

Initially, the handle 176 of the cartridge 98 is turned in a direction that will displace the second member 138 of the header 104 away from the first member 110, as has been described above, to break the seal between the header and the filter aperture in which the header is mounted. The lug 178 on the cartridge is then grasped and the cartridge is then turned through an angle that will force the shanks 88 of the studs 80, 82 against the balls 128 disposed at the mouths of the channels 120, 122 formed in the wings 116, 118 extending laterally from central portions of the header. Such turning of the header forces the balls 128 into the blind holes in the header so that the shanks of the studs 80, 82 leave the channels 120, 122. As the shanks of the studs leave the channels 120, 122 the heads 90 of the studs disengage from the first end 106 of the header so that the cartridge can be drawn vertically upwardly from the filter aperture 36 and, thence, from the tank 12.

Once the cartridge has been removed from the tank, the user of the apparatus 10 is provided with several options representing a balance between cost and speed of returning the filter apparatus 10 to operation. Where cost is the more important factor, the screw 186 in the bore of the plug 180 in the lower end of the filter support tube 158 can be unscrewed therefrom so that the filter element 162 of the cartridge can be removed. The filter element 162 can then be cleaned and replaced on the filter support tube 158 and secured thereto by again screwing the screw 186 into the bore of the plug 180 to clamp the filter element 162 between the header and the plate 188 at the end of the filter support tube 158. (In some cases, especially where down time of the process in which the apparatus 10 is to be used is an important but not overriding factor, the filter element 162 can be replaced with a new filter element and the used filter element either discarded or cleaned and returned to stock.)

Where down time of the process in which the filter apparatus 10 is used is an overriding consideration, the apparatus 10 is provided with spare filter cartridges so that, immediately following the removal of cartridges having clogged filter elements 162, the spare cartridges are inserted into the apparatus 10 and the cover 18 of the apparatus 10 is replaced on the tank 12 and secured thereto via the dogs 60 so that the apparatus 10 can be returned to operation. The replacement of the cartridges in the tank 12 is accomplished in reverse order to the order in which the cartridges are removed. That is, and again referring specifically to cartridge 98, with the handle 176 of the sealing system turned so that the sealing ring 156 is loosely contained within the groove in the header formed by the shoulder 154, the circular portions of the header 104 near the second end 108 thereof are inserted into the filter aperture 36 and the header is then turned so that the channels 120, 122 in the first member 110 thereof are moved to a position in which such channels receive the shanks 88 of the studs 80, 82 in the manner shown in FIG. 5. The handle 176 of the sealing system 160 is then turned to draw the second member 138 of the header against the second end 112 of the first member 110 of the header and thereby effect a seal between lower portions of the header of the filter cartridge and the wall of the aperture 36 as has been discussed above. The apparatus 10 is then closed by pivoting the cover 18 to overlay the tank 12 and securing the cover to the tank with dogs 60. The apparatus 10 is returned to service.

It will thus be seen that the present invention provides a filter apparatus which is capable of filtering liquid-gas mixtures and, concurrently, provides a rapid filter element replacement capability that can be effected without danger of contaminating portions of the filter apparatus in which filtered fluid is to be disposed.

It is therefore clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. An apparatus for filtering a liquid-gas mixture using replaceable filter elements, comprising:
    a tank having an open upper end and a closed lower end;
    a cover secureable across the upper end of the tank for alternatively closing the tank and providing access to the tank interior;
    a partition sealed to the tank wall near the upper end of the tank to extend across the tank interior and divide the tank interior into an upper chamber above the partition and a lower chamber below the partition, wherein the upper surface of the partition is formed into an upper tier and a lower tier disposed a distance below the upper tier, and wherein a filter aperture having a circular wall is formed through the partition to intersect said upper tier; and
    filter means, comprising a replaceable filter element, detachably mounted on said partition for filtering fluid passing through said filter aperture, the filter means comprising:
        a header having a first end, a second end and a longitudinal header bore formed therethrough to intersect the ends of the header, portions of the header near the second end thereof having a circular periphery to be matingly received in the filter aperture form the upper side of said partition, wherein a laterally extending wing having a longitudinal channel paralleling the header bore in one side thereof is formed on portions of the header disposed above said partition;
        means mounted in the header for releaseably securing a shank placed in said channel within the channel; and
        means, including said replaceable filter element, mounted on the header for filtering fluid passing through said header bore;
    wherein a stud is mounted on the partition adjacent the filter aperture to extend from the upper side thereof, the stud having a shank sized and positioned on the partition to be received in said channel at such times that the circular portions of the header are received in the filter aperture, and the stud having an enlarged head at the upper end thereof to overlay portions of said wing; and wherein the tank has an inlet port opening into the lower chamber of the tank and an outlet port opening into the upper chamber of the tank above the lower tier of the partition and on a level wherein the outlet port is bisected by the upper tier of the partition.

2. The apparatus of claim 1 wherein a transverse blind hole is formed in the header to open into the mouth of said channel; and wherein the means for releaseably securing a shank within said channel comprises:
    a ball mounted in said blind hole; and
    a spring disposed in said blind hole so as to urge portions of the ball into the channel.

3. The apparatus of claim 1 wherein the means for filtering fluid passing through the header bore further comprises:
- a filter support tube mounted in the header bore and extending from the second end of the header, the filter support tube having a plurality of perforations formed through the wall thereof for receiving fluid flow into the filter support tube, said filter element having a tubular form to extend about the filter support tube and filter fluid flowing into said support tube; and
- means for securing the filter element on the support tube about said perforations.

4. The apparatus of claim 3 wherein the header comprises:
- a first member having a first end coincident with the first end of the header and an opposite second end, portions of the first member adjacent the second end thereof having a circular outer periphery to be received in said filter aperture, wherein a longitudinal bore threaded in a first sense is formed through the first member to intersect the ends thereof and form a portion of the header bore;
- a second member having a second end coincident with the second end of the header and a first end facing the second end of the first member and abutable therewith, the second member having a circular periphery mateable with said filter aperture formed coaxially with circular portions of the periphery of the first member, wherein portions of the filter support tube extend through the second member to form a tubular projection extending coaxially into the bore of the first member, said projection being externally threaded in a second sense opposite said first sense, and wherein a shoulder is formed in the periphery of one of the first and second members at the end thereof abutable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

5. The apparatus of claim 2 wherein two laterally extending wings are formed on portions of the header disposed above said partition, each wing having a longitudinal channel parallelling the header bore formed in one side thereof, the wings disposed in diametric opposition on the header with respect to the header bore and the channels in the wings opening in opposite directions; wherein the filter means is further characterized as comprising means mounted in the header for releaseably securing shanks placed in each of said channels; and wherein two studs are mounted on the partition adjacent the filter aperture and in diametric opposition with respect to the filter aperture to extend from the upper side thereof, each stud having a shank sized and positioned on the partition to be received in one of said channels at such times that the circular portions of the header are received in the filter aperture and each stud having an enlarged head at the upper end thereof to overlay portions of the wing receiving the shank of the stud.

6. The apparatus of claim 5 wherein the means for filtering fluid passing through the header bore further comprises:
- a filter support tube mounted in the header bore and extending from the second end of the header, the filter support tube having a plurality of perforations formed through the wall thereof for receiving fluid flow into the filter support tube, said filter element having a tubular form to extend about the filter support tube and filter fluid flowing into said support tube; and
- means for securing the filter element on the support tube about said perforations.

7. An apparatus for filtering a liquid-gas mixture using replaceable filter elements, comprising:
- a tank having an open upper end and a closed lower end;
- a cover secureable across the upper end of the tank for alternatively closing the tank and providing access to the tank interior;
- a partition sealed to the tank wall near the upper end of the tank to extend across the tank interior and divide the tank interior into an upper chamber above the partition and a lower chamber below the partition, wherein the upper surface of the partition is formed into an upper tier and a lower tier disposed a distance below the upper tier, and wherein a plurality of filter apertures are formed through the partition to intersect said upper tier; and
- a plurality of filter cartridges, each cartirdge detachably mounted on the partition for filtering fluid passing through one of said filter apertures, each filter cartridge comprising:
  - a header detachably secured to the partition, the header having a first end disposed above the partition and a second end insertable into one of said filter apertures, the header further having a header bore formed therethrough to intersect the ends of the header;
  - a filter support tube mounted in the header bore and extending from the second end of the header into the lower chamber of the tank, the filter support tube having a plurality of perforations formed through the wall thereof for receiving fluid flow into the filter support tube from said lower chamber of the tank;
  - a porous, tubular filter element disposable on the filter support tube to extend thereabout for filtering fluid flowing into said support tube; and
  - means for securing the filter element on the support tube; and wherein the tank has an inlet port opening into the lower chamber of the tank and an outlet port opening into the upper chamber of the tank above the lower tier of the partition and on a level wherein the outlet port is bisected by the upper tier of the partition.

8. The apparatus of claim 7 wherein each filter cartridge further comprises a U-shaped lug mounted on the first end of the header to extend over the header bore.

9. The apparatus of claim 7 wherein the header of each filter cartridge is characterized as having at least one laterally extending wing, formed on portions of the header disposed above the partition, each wing having a longitudinal channel parallelling the header bore in one side of the wing; wherein the header of each cartridge comprises means for releaseably securing a shank placed in the channel of a wing within said channel; and wherein a stud is mounted on the partition adjacent a filter aperture for each wing of each header, each stud extending from the upper side of the partition and having a shank sized and positioned on the partition to be received in a channel formed in a wing of the header of one of said filter cartridges at such times that portions of the header of the cartridge are disposed within the filter aperture adjacent the stud, and each stud having an enlarged head at the upper end thereof to overlay portions of a wing wherein the shank of the stud is received.

10. A filter cartridge, comprising:
- a header having a longitudinal header bore formed therethrough and a laterally extending wing having a longitudinal channel, parallelling the header bore, formed in one side of said wing;
- means mounted in the header for releasably securing a shank placed in said channel within said channel; and
- means mounted on the header for filtering fluid passing through said header bore.

11. The filter cartridge of claim 10 wherein a transverse blind hole is formed in the header to open into the mouth of said channel; and wherein the means for releasably securing a shank within said channel comprises:
- a ball mounted in said blind hole; and
- a spring disposed in said blind hole so as to urge portions of the ball into the channel.

12. The filter cartridge of claim 11 wherein the header is characterized as having a first end and a second end, said ends of the header intersected by the header bore; and wherein the means for filtering fluid passing through the header bore comprises:
- a filter support tube mounted in the header bore and extending from the second end of the header, the filter support tube having a plurality of perforations formed through the wall thereof for receiving fluid flow into the filter support tube;
- a porous, tubular filter element disposable on the filter support tube to extend thereabout for filtering fluid flowing into said support tube; and
- means for securing the filter element on the support tube.

13. The filter cartridge of claim 12 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abutable therewith, the second member having a circular periphery formed on said preselected diameter coaxially with said circular portions of the periphery of the first member, wherein portions of the filter support tube extend through the second member to form a tubular projection extending coaxially into the bore of the first member, said projection being externally threaded in a second sense opposite said first sense, and wherein a shoulder is formed in the periphery of one of the first and second members at the end thereof abuttable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

14. The filter cartridge of claim 11 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abuttable therewith, the second member having a circular periphery formed on said preselected diameter coaxially with said circular portions of the periphery of the first member, wherein a tubular projection is formed on the second member to extend coaxially into the bore of the first member, said projection being externally threaded in a second sense opposite said first sense, and wherein a shoulder is formed in the periphery of one of the first and second members at the end thereof abutable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

15. The filter cartridge of claim 10 wherein the header is characterized as having a first end and a second end, said ends of the header intersected by the header bore; and wherein the means for filtering fluid passing through the header bore comprises:
- a filter support tube mounted in the header bore and extending from the second end of the header, the filter support tube having a plurality of perforations formed through the wall thereof for receiving fluid flow into the filter support tube;
- a porous, tubular filter element disposable on the filter support tube to extend thereabout for filtering fluid flowing into said support tube; and
- means for securing the filter element on the support tube.

16. The filter cartridge of claim 15 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abutable therewith, the second member having a circular periphery formed on said preselected diameter coaxially with said circular portions of the periphery of the first member, wherein portions of the filter support tube extend through the second member to form a tubular projection extending coaxially into the bore of the first member, said projection being externally threaded in a second sense opposite said first sense, and wherein a shoulder is formed in the periphery of one of the first and second members at the end thereof abuttable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

17. The filter cartridge of claim 10 wherein the header is characterized as having two diametrically opposed laterally extending wings with respect to the header bore, each wing having a longitudinal channel formed in one side thereof parallel to the header bore and the channels in the wings opening in opposite directions; and
- means mounted in the header for releasably securing a shank placed in either of said channels within such channel.

18. The filter cartridge of 17 wherein two transverse blind holes are formed in the header, each blind hole opening into the mouth of one of said channels; and wherein the means for releasably securing a shank within each of said channels comprises:
- a ball mounted in each of said blind holes; and
- a spring disposed in each of said blind holes so as to urge portions of the ball in the blind hole into the channel into which said hole opens.

19. The filter cartridge of claim 18 wherein the header is characterized as having a first end and a second end, said ends of the header intersected by the header bore; and wherein the means for filtering fluid passing through the header bore comprises:
- a filter support tube mounted in the header bore and extending from the second end of the header, the filter support tube having a plurality of perforations formed through the wall thereof for receiving fluid flow into the filter support tube;
- a porous, tubular filter element disposable on the filter support tube to extend thereabout for filtering fluid flowing into said support tube; and
- means for securing the filter element on the support tube.

20. The filter cartridge of claim 19 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abutable therewith, the second member having a circular periphery formed on said preselected diameter coaxially with said circular portions of the periphery of the first member, wherein portions of the filter support tube extend through the second member to form a tubular projection extending coaxially into the bore of the first member, said projection being externally threaded in a second sense opposite said first sense, and wherein a shoulder is formed in the periphery of one of the first and second members at the end thereof abutable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

21. The filter cartridge of claim 18 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abuttable therewith, the second member having a circular periphery formed on said preselected diameter coaxially with said circular portions of the periphery of the first member, wherein a tubular projection is formed on the second member to extend coaxially into the bore of the first member, said projection being externally threaded in a second sense opposite said first sense, and wherein a shoulder is formed in the periphery of one of the first and second members at the end thereof abutable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

22. The filter cartridge of claim 17 wherein the header is characterized as having a first end and a second end, said ends of the header intersected by the header bore; and wherein the means for filtering fluid passing through the header bore comprises:
- a filter support tube mounted in the header bore and extending from the second end of the header, the filter support tube having a plurality of perforations formed through the wall thereof for receiving fluid flow into the filter support tube;
- a porous, tubular filter element disposable on the filter support tube to extend thereabout for filtering fluid flowing into said support tube; and
- means for securing the filter element on the support tube.

23. The filter cartridge of claim 22 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abutable therewith, the second member having a circular periphery formed on said preselected diameter coaxially with said circular portions of the periphery of the first member, wherein portions of the filter support tube extend through the second member to form a tubular projection extending coaxially into the bore of the first member, said projection being externally threaded in a second sense opposite said first sense, and wherein a shoulder is formed in the periphery of one of the first and second members at the end thereof abuttable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

24. The filter cartridge of claim 17 wherein the header comprises:
- a first member having a first end coincident with the first end of the header and an opposite second end, portions of the first member adjacent the second end thereof having a circular outer periphery formed on a preselected diameter to be received in a circular aperture, wherein a longtitudinal bore threaded in a first sense is formed through the first member to intersect the ends thereof and form a portion of the header bore;
- a second member having a second end coincident with the second end of the header and a first end facing the second end of the first member and abuttable therewith, the second member having a circular periphery formed on said preselected diameter coaxially with said circular portions of the periphery of the first member, wherein a tubular projection is formed on the second member to extend coaxially into the bore of the first member, said projection being externally threaded in a second sense opposite said first sense, and wherein a shoulder is formed in the periphery of one of the first and second members at the end thereof abuttable with the other member, said shoulder extending circumferentially about portions of such member to form a groove in the periphery of the header when the first end of the second member is abutted with the second end of the first member;
- a tubular coupling having external threads to mate with the threads in the bore of the first member and internal threads to mate with the threads on the projection of the second member, the coupling screwed into the bore of the first member and onto the projection of the second member;
- indexing means for preventing relative rotation of the first and second members whereby the tubular coupling can be turned in one direction to separate the members and turned in the opposite direction to draw the members into abutment; and
- an elastomeric sealing ring disposed in said shoulder to extend circumferentially about the header.

* * * * *